United States Patent
Jung et al.

(10) Patent No.: US 12,536,998 B2
(45) Date of Patent: Jan. 27, 2026

(54) DISPLAY DEVICE

(71) Applicant: LG ELECTRONICS INC., Seoul (KR)

(72) Inventors: Eunkyung Jung, Seoul (KR); Woojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/756,470

(22) PCT Filed: Nov. 26, 2019

(86) PCT No.: PCT/KR2019/016357
§ 371 (c)(1),
(2) Date: May 25, 2022

(87) PCT Pub. No.: WO2021/107174
PCT Pub. Date: Jun. 3, 2021

(65) Prior Publication Data
US 2022/0415322 A1     Dec. 29, 2022

(51) Int. Cl.
*G10L 15/22*     (2006.01)
*G06F 3/14*     (2006.01)
*G10L 15/08*     (2006.01)

(52) U.S. Cl.
CPC ............... *G10L 15/22* (2013.01); *G06F 3/14* (2013.01); *G10L 15/08* (2013.01); *G10L 2015/088* (2013.01); *G10L 2015/223* (2013.01)

(58) Field of Classification Search
CPC ... G10L 15/22; G10L 15/08; G10L 2015/088; G10L 2015/223; G06F 3/14; G06F 1/3231; G06F 1/3265; G06F 3/167
See application file for complete search history.

(56) References Cited

U.S. PATENT DOCUMENTS

| | | | |
|---|---|---|---|
| 10,304,465 B2 | 5/2019 | Gunn et al. | |
| 10,366,688 B2 * | 7/2019 | Gunn | G10L 15/08 |
| 2014/0337036 A1 | 11/2014 | Haiut et al. | |
| 2016/0150472 A1 * | 5/2016 | Yoon | G06F 1/3293 455/574 |
| 2018/0299289 A1 * | 10/2018 | Hill | G01C 21/3608 |

(Continued)

FOREIGN PATENT DOCUMENTS

| | | |
|---|---|---|
| KR | 1020190051425 | 5/2019 |
| KR | 1020190096308 | 8/2019 |

OTHER PUBLICATIONS

PCT International Application No. PCT/KR2019/016357, International Search Report dated Aug. 20, 2020, 2 pages.

(Continued)

*Primary Examiner* — Daniel C Washburn
*Assistant Examiner* — Penny L Caudle
(74) *Attorney, Agent, or Firm* — LEE, HONG, DEGERMAN, KANG & WAIMEY

(57) ABSTRACT

The present disclosure provides display device which allows a user to control power supply from a distance. The display device may comprise a display unit; a speech obtaining unit for recognizing speech; and a control unit for controlling a power supply mode to an active mode when both a primary command and a second command are sequentially recognized through the speech obtaining unit.

11 Claims, 14 Drawing Sheets

(56) References Cited

U.S. PATENT DOCUMENTS

| | | | | |
|---|---|---|---|---|
| 2018/0316966 A1* | 11/2018 | Krieger | ................ | H04N 21/441 |
| 2018/0336905 A1* | 11/2018 | Kim | ........................ | G10L 17/22 |
| 2019/0341026 A1* | 11/2019 | Visser | ..................... | G10L 25/63 |

OTHER PUBLICATIONS

European Patent Office Application Serial No. 19954069.1, Office Action dated Sep. 26, 2024, 7 pages.

Gauthier Reveret, Dolphin Integration, "A versatile Control Network of power domains in a low power SoC", 5 pages, https://www.design-reuse.com/articles/39403/a-versatile-control-network-of-power-domains-in-a-low-power-soc.html.

* cited by examiner (a)

(b)

(a)

(b)

(a)

(b)

(a)

(b)

(a)

(b)

(a)

(b)

(a)

(b)

DISPLAY DEVICE

CROSS-REFERENCE TO RELATED APPLICATIONS

This application is the National Stage filing under 35 U.S.C. 371 of International Application No. PCT/KR2019/016357, filed on Nov. 26, 2019, the contents of which are all incorporated by reference herein in its entirety.

TECHNICAL FIELD

The present disclosure relates to a display apparatus.

BACKGROUND ART

Recently, as voice recognition technology has been developed, the needs for users to control various electronic devices with their vice are increasing. Accordingly, the types of electronic devices including a function for recognizing a user's voice are also increasing.

Meanwhile, as the types of electronic devices capable of recognizing a user's voice increases, several electronic devices may operate according to the same command. For example, when a TV and a speaker located in the same place are set to be powered on by a command "turn on the power", a user intended to turn on the power of the speaker, but the TV may also be powered on. That is, when the power of the electronic device is controlled through voice from a distance, malfunction may occur due to erroneous recognition of voice.

In particular, when the power of a display device such as a TV is controlled to be turned on due to malfunction, the screen is turned on and thus unnecessary power consumption increases unlike other electronic devices such as a speaker, thereby leading to user inconvenience.

INVENTION

Technical Problem

The present disclosure is to provide a display device for solving the above-described problems.

The present disclosure is to provide a display device which enables a user to remotely control the power.

The present disclosure is to provide a display device that minimizes power consumption when the power is controlled through voice recognition.

The present disclosure is to provide a display device that minimizes malfunction according to a command for controlling another device.

The present disclosure is to provide a display device capable of voice recognition regardless of the type or state of a natural language processing (NLP) module.

Technical Solution

A display device according to the present disclosure may comprise a display, an audio acquisition module configured to recognize audio, and a controller configured to control a power mode to an active mode when both a primary command and a second command are sequentially recognized through the audio acquisition module.

The controller may recognize the primary command when the power mode is a suspend mode, and recognize the secondary command when the power mode is an active-standby mode.

The controller may recognize the primary command when the power mode is a suspend mode, and switch the power mode from the suspend mode to an active-standby mode, when the primary command is recognized in the suspend mode, and maintain the suspend mode when the primary command is not recognized in the suspend mode.

The controller may recognize the secondary command when the power mode is an active-standby mode, and switch the power mode from the active-standby mode to the active mode, when the secondary command is recognized in the active-standby mode.

The controller may switch the power mode from the active-standby mode to the suspend mode, when the secondary command is not recognized in the active-standby mode.

The controller may recognize the primary mode when the power mode is a suspend mode, switch the power mode from the suspend mode to an active-standby mode when the primary command is recognized in the suspend mode, recognize the secondary command when the power mode is an active-standby mode, and switch the power mode from the active-standby mode to the active mode when the secondary command is recognized in the active-standby mode.

The controller may output a primary command recognition notification, when the primary command has been recognized or the primary command is current being recognized.

The display device may further comprise a light emitter, and the controller may output the primary command recognition notification by driving the light emitter.

The controller may output a secondary command recognition notification, after recognizing the primary command.

The display device may further comprise an audio output interface, and the controller may output the secondary command recognition notification by driving the audio output interface.

The controller may control a voice recognition module to be turned on when the primary command is recognized.

The controller may control the voice recognition module to be turned off when the secondary command is not recognized after the primary command is recognized.

The controller may differently control an image or information displayed through the display according to the second command.

When the secondary command includes a preset keyword, the controller may control the display to display at least one of an image or information set in correspondence with the keyword.

When the keyword included in the secondary command is a power-on related keyword, the controller may control the display to display a channel image when power is turned off immediately before.

When the keyword included in the secondary command is a time related keyword, the controller may control the display to display a broadcast image and information corresponding to a time.

When the keyword included in the secondary command is a user related keyword, the controller may control the display to display a broadcast image and user device information.

The display may display state information of an external device connected to the display device as the user device information.

When the keyword included in the secondary command is a channel related keyword, the controller may control the display to display an image of a channel included in the secondary command.

When the keyword included in the secondary command is an application related keyword, the controller may control the display to display an execution image of an application included in the secondary command.

Effect of the Invention

According to the present disclosure, since power is controlled when both a primary command and a secondary command are sequentially recognized, it is possible to provide a display device capable of minimizing the possibility of malfunction due to misrecognition of commands.

According to the present disclosure, since the power mode before and after a primary command and a second command are recognized, it is possible to provide a display device capable of minimizing power consumption for remote voice recognition.

According to the present disclosure, by outputting a state while or after a primary command is recognized or before a second command is recognized as a notification, it is possible to provide a display device capable of minimizing a deviation between command recognition timing and user's utterance timing. In particular, it is possible to provide a display device capable of minimizing a deviation between command recognition timing and user's utterance timing when a server based NLP module is used.

According to the present disclosure, it is possible to provide a display device with improved operation accuracy regardless of a network state, by recognizing a primary command and a second command through an embedded NLP module and controlling the power.

According to the present disclosure, since power control is possible by performing recognition through an embedded NLP module, it is possible to provide a display device capable of remote power control regardless of the language of each country.

According to the present disclosure, since various keywords for a second command may be set, it is possible to provide a display device capable of more rapidly and accurately displaying various images or information according to the user.

BEST MODE

Hereinafter, the embodiments disclosed herein will be described in detail with reference to the accompanying drawings. The suffixes "module" and "unit or portion" for components used in the following description are merely provided only for facilitation of preparing this specification, and thus they are not granted a specific meaning or function.

Figure 1:
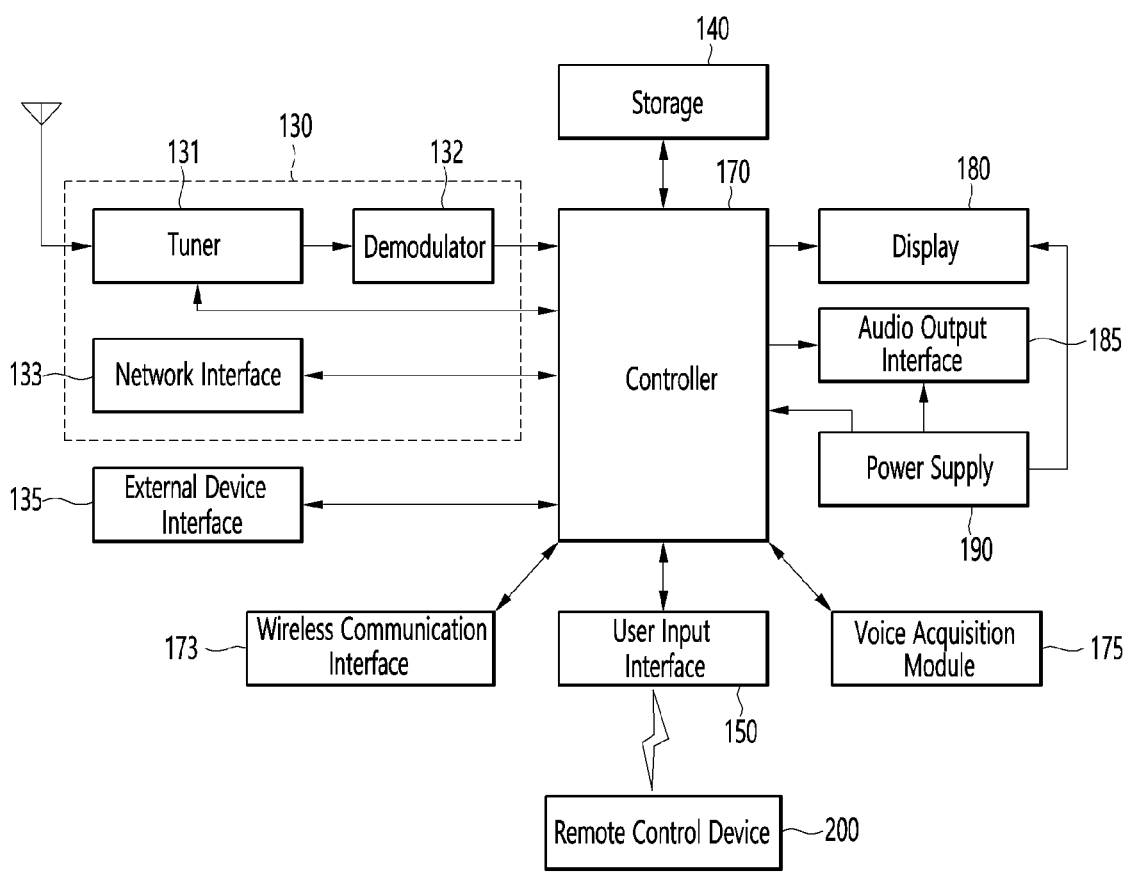
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
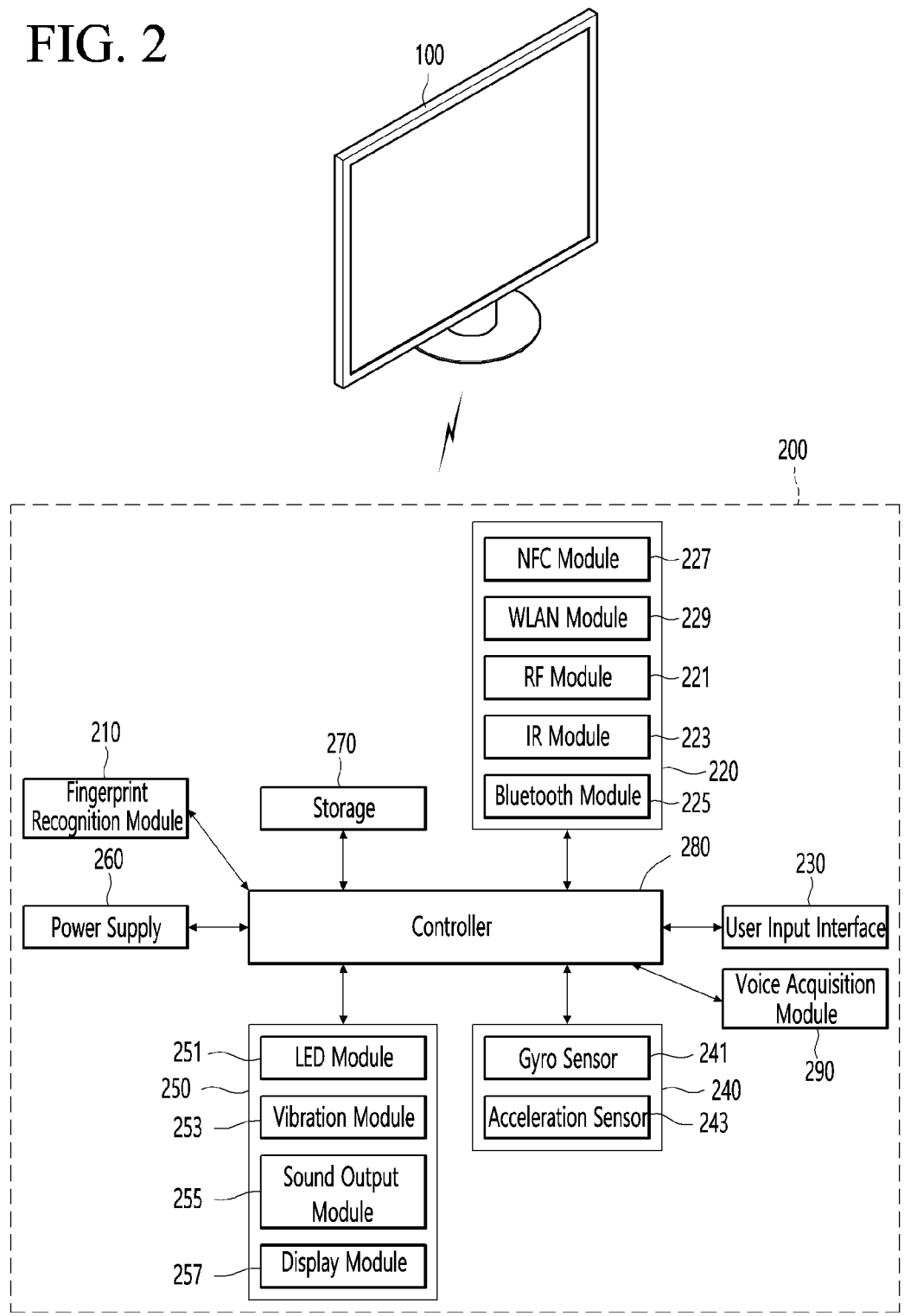
FIG. 2 is a block diagram illustrating a remote control device according to an embodiment of the present disclosure.
Figure 3:
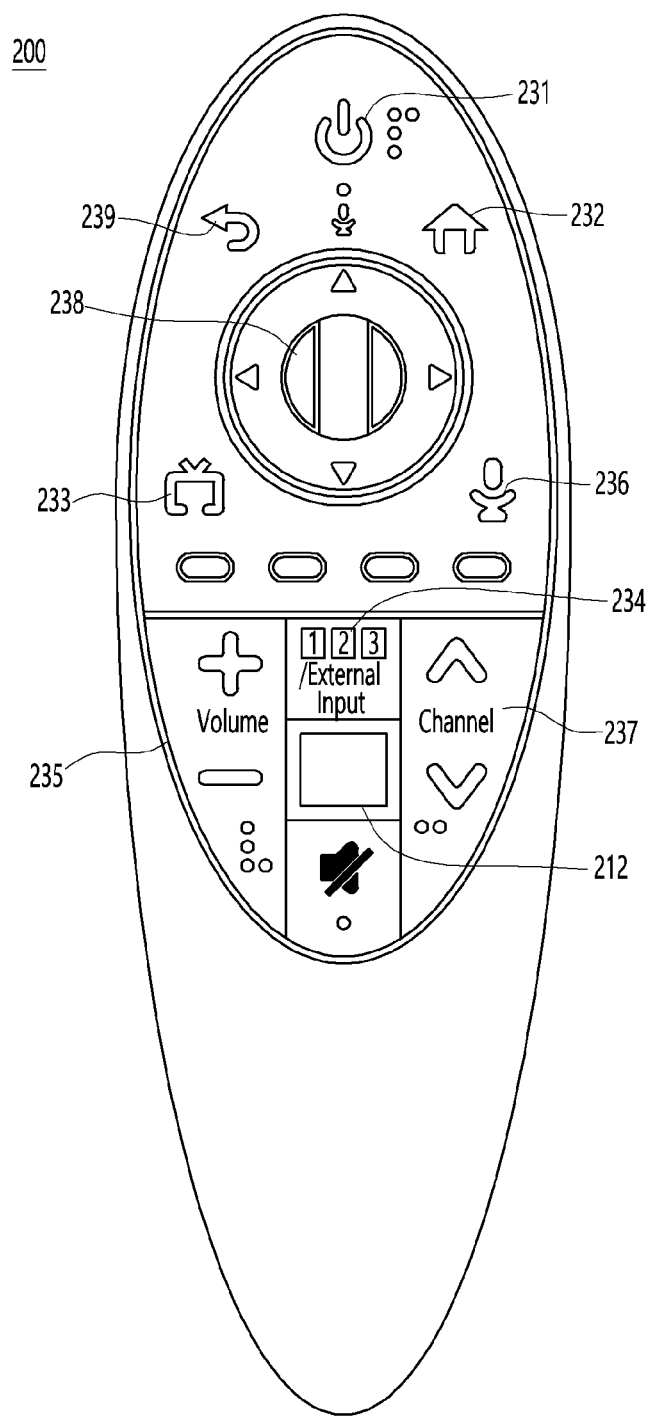
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
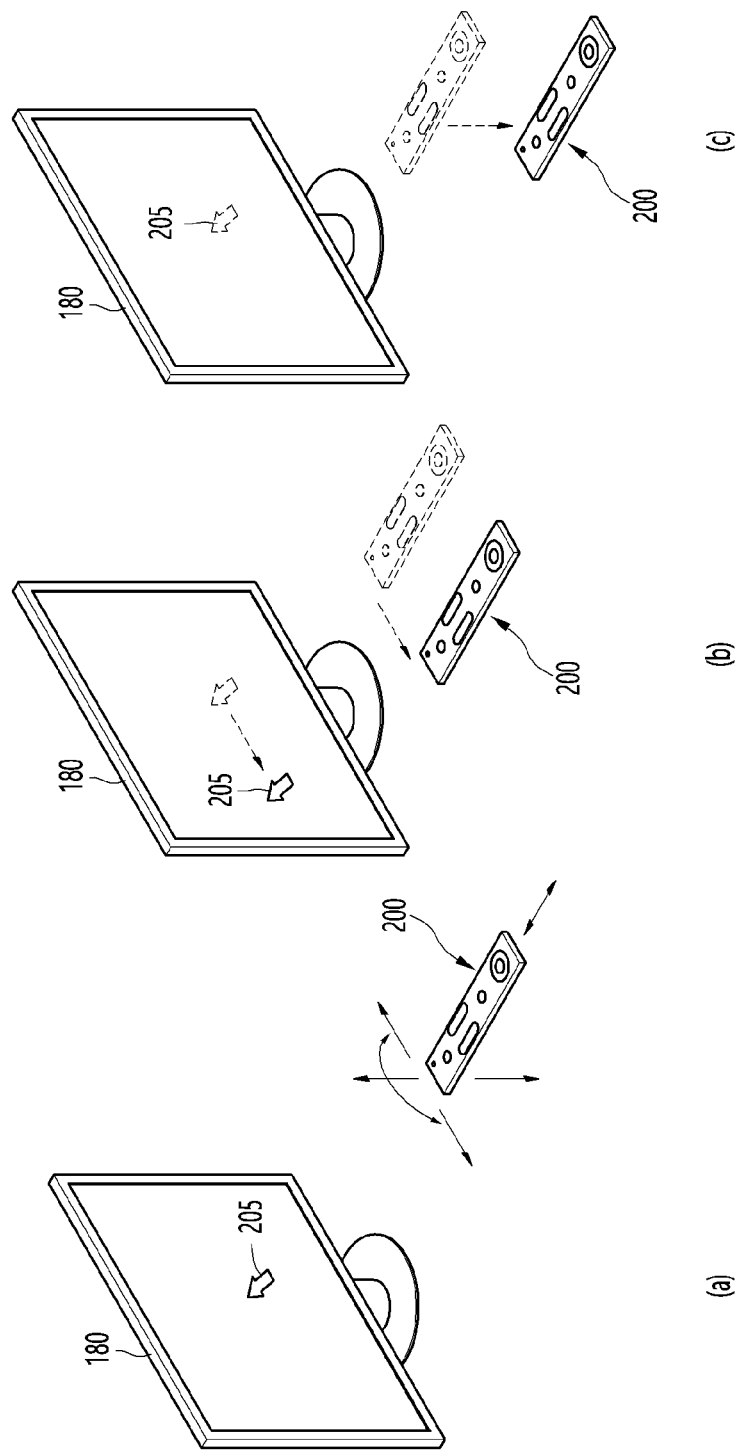
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The controller 170 of the display device 100 may be divided into a main controller and a sub controller.

The main controller is a Main CPU (central processing unit) and may receive various inputs and control various outputs accordingly. The main controller may control the broadcast reception module 130, the external device interface 135, the display 180, etc. and control various operations related to a display function.

The sub controller is a DSP (digital signal processor) and may be configured to reduce the burden on the main controller. The sub controller may be an auxiliary processor separate from the main controller.

The sub controller may only perform digital signal processing such as recognizing a voice from an audio acquired by the voice acquisition module 175. The sub controller may remove noise of an input signal of a microphone (not shown) and recognize a command.

Meanwhile, the main controller may include a voice recognition module (not shown).

The voice recognition module (not shown) may not only recognize the voice from the audio acquired by the voice acquisition unit 175 but also perform intention analysis of the recognized voice.

Specifically, the voice recognition module (not shown) may analyze the intention of the voice through a NLP (Natural Language Processing) module. The voice recognition module (not shown) may include a NLP module therein, and perform voice recognition and voice intention analysis through the NLP module. As such, the NLP module provided inside the voice recognition module (not shown) may be an embedded NLP module.

Meanwhile, in some embodiments, the voice recognition module (not shown) may perform voice recognition and voice intention analysis through communication with a server-based NLP module without the embedded NLP module.

The main controller operates by receiving power in a start mode, an end mode, an active-standby mode, an active mode, and may not receive power in a suspend mode.

The sub controller may operate by receiving power not only in the start mode, the end mode, the active-standby mode and the active mode but also in the suspend mode.

In the present disclosure, the 'controller' performing control may mean that at least one of the "main controller" or the "sub controller" performs control. In particular, the 'controller' performing control in the start mode, the end mode, the active-standby mode and the active mode may mean that at least one of the "main controller" or the "sub controller" performs control, and the 'controller' performing control in the suspend mode may mean that the "sub controller" performs control. However, since the subject of control may be changed in some embodiments, the present disclosure is not limited to the above meanings.

Next, power modes such as the start mode, the end mode, the active-standby mode, the active mode and the suspend mode will be described.

Figure 5A:
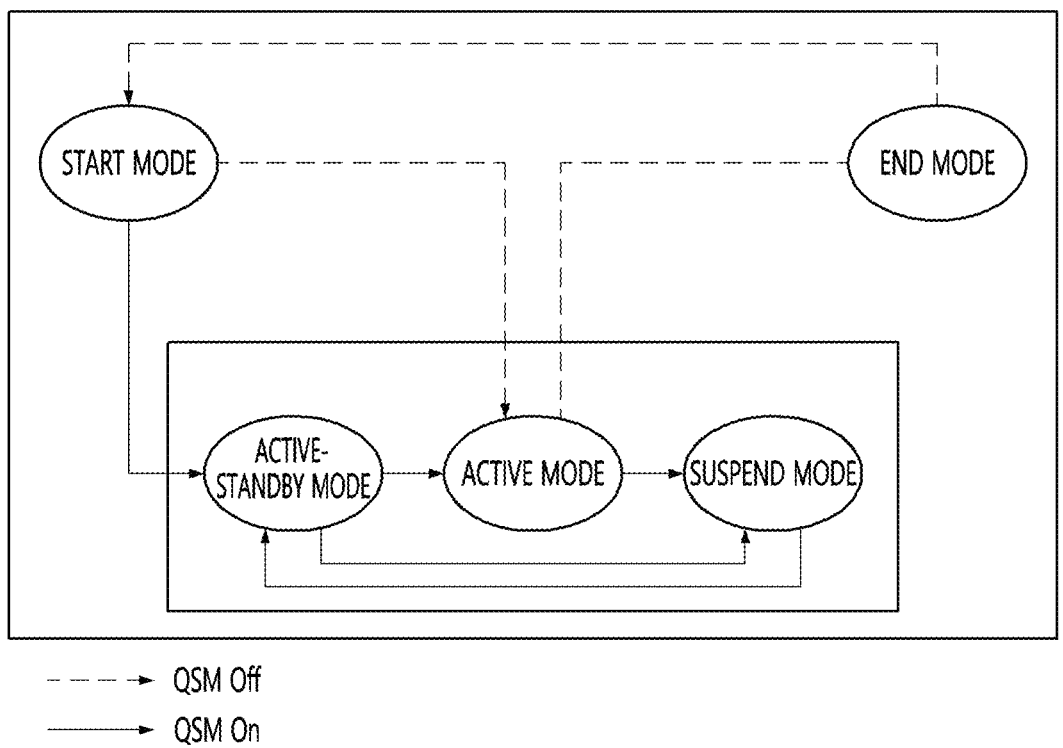
FIG. 5A and FIG. 5B are views illustrating a power mode of a display device according to the present disclosure.
Figure 5B:
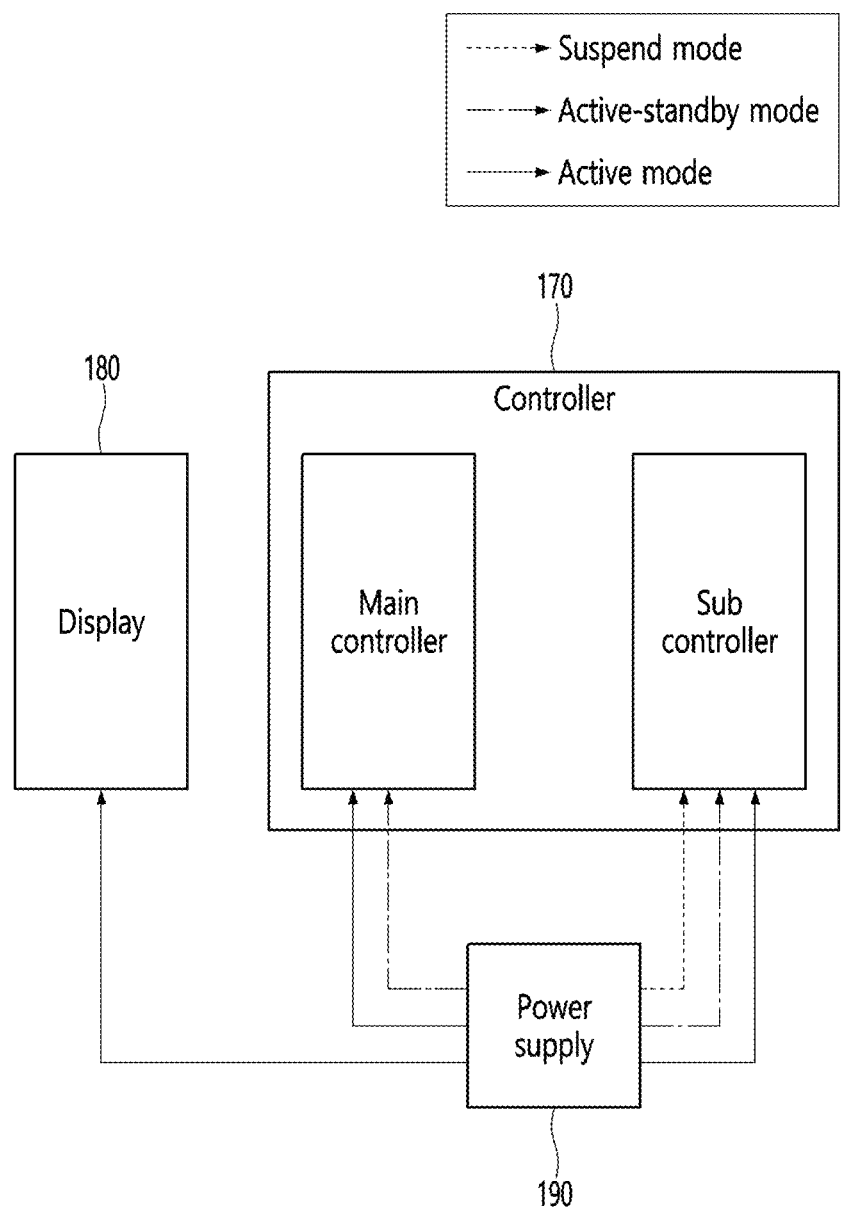

FIG. 5A and FIG. 5B are views illustrating a power mode of a display device according to the present disclosure.

The display device 100 may support a QSM (Quick Start Mode). The QSM may be a mode for reducing a time required to turn on the power.

The controller 170 may control the power mode to be the start mode, the active mode or the end mode, if the QSM is off.

The start mode may be a mode in which booting is performed immediately after the power is turned on. The start mode may be a mode for performing an init process.

The active mode may be a normal operation mode. In the active mode, power may be supplied to the main components of the display device 100, such as the controller 170 and the display 180.

The end mode may be a mode for performing operation necessary to end power. The end mode may be performed immediately before the power is turned off.

The controller 170 may control the power mode in order of the start mode and the active mode if a power-on command is received when the QSM is off and control the power mode in order of the active mode and the end mode if a power-off command is received when the QSM is off.

In this case, in the start mode, since data necessary for operation of the display device 100 is newly loaded, a required time may be relatively long.

The controller 170 may control the power mode to be the active-standby mode, the active mode or the suspend mode when the QSM is on.

The active-standby mode is a mode that normal operation is performed only internally and a power-off state is recognized externally. In the active-standby mode, power is not supplied to the display 180, but power may be supplied only to the controller 170.

In the active-standby mode, since power is supplied to the controller 170, the voice recognition module (not shown) may be controlled to be turned on and thus may be operated.

The active mode is a normal operation mode and may be a mode in which power is supplied to main components in the display device 100, such as the controller 170, the display 180, etc., as described above.

The suspend mode may be a mode in which a power-off state is recognized externally and only power necessary to preserve predetermined data is supplied internally. In the suspend mode, power is supplied to only some components such as the sub controller, a double data rate (DDR), etc. and power may not be supplied to the controller 170 and the display 180.

In the suspend mode, since power is supplied to the sub controller, voice recognition may be possible. In addition, the suspend mode may be a mode in which a clock entering DDR is turned off by performing DDR self-refresh and data is maintained by periodically performing refresh using a counter inside the DDR controller.

Accordingly, the controller 170 may control the power mode in order of the active-standby mode and the active mode if the power-on command is received when the QSM is on and control the power mode in the active mode and the suspend mode if the power-off command is received when the QSM is on.

In this case, since the data is preserved in the suspend mode, when the power mode is switched from the suspend mode to the active-standby mode according to the power-on command, the data preserved in the suspend mode may be restored in the active-standby mode, thereby more rapidly performing normal operation.

The display device 100 according to the present disclosure may recognize a voice by secondary verification of a command through the sub controller and the main controller according to the power mode.

In particular, the display device 100 may be set to operate only when the command is secondarily verified if operation related to power control is set to be performed according to a voice command, thereby minimizing malfunction due to voice misrecognition.

Although a method in which the display device 100 operates by secondarily verifying the command related to power control is described below, this is only an example for convenience of description and the present disclosure is not limited thereto. That is, the display device 100 according to the present disclosure may operate by recognizing not only the command related to power control but also all commands controllable through voice recognition (e.g., channel-up command, menu display command, etc.) using the following method.

Figure 6:
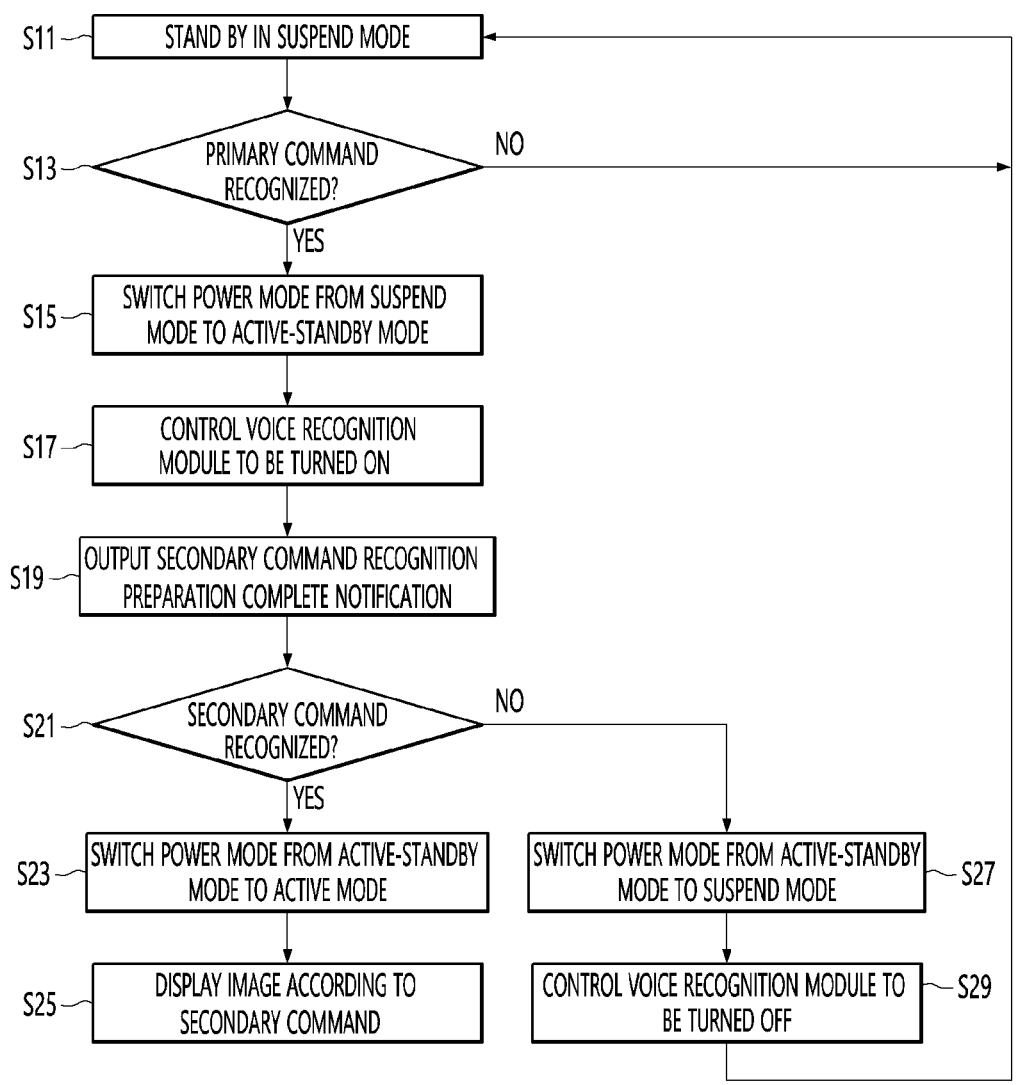
FIG. 6 is a flowchart illustrating a method of operating a display device according to an embodiment of the present disclosure.

FIG. 6 is a flowchart illustrating a method of operating a display device according to an embodiment of the present disclosure.

The controller 170 may stand by in the suspend mode (S11).

In the suspend mode, the power supply 190 may supply power to the sub controller and may not supply power to the main controller.

The controller 170 may recognize a primary command when the power mode is a suspend mode (S13).

In particular, when the power mode is a suspend mode, the sub controller may recognize the primary command.

The primary command may be a command for operating the main controller. The primary command may be a command for switching the power mode from the suspend mode to the active-standby mode.

The primary command may be preset. For example, the primary command may be "Hi, LG", but this is only an example and the primary command is not limited thereto.

The primary command may be changed according to user settings. The number of primary commands may be one or two or more.

According to an embodiment, the controller 170 may output a primary command recognition notification when the primary command has been recognized or the primary command is currently being recognized.

Figure 7:
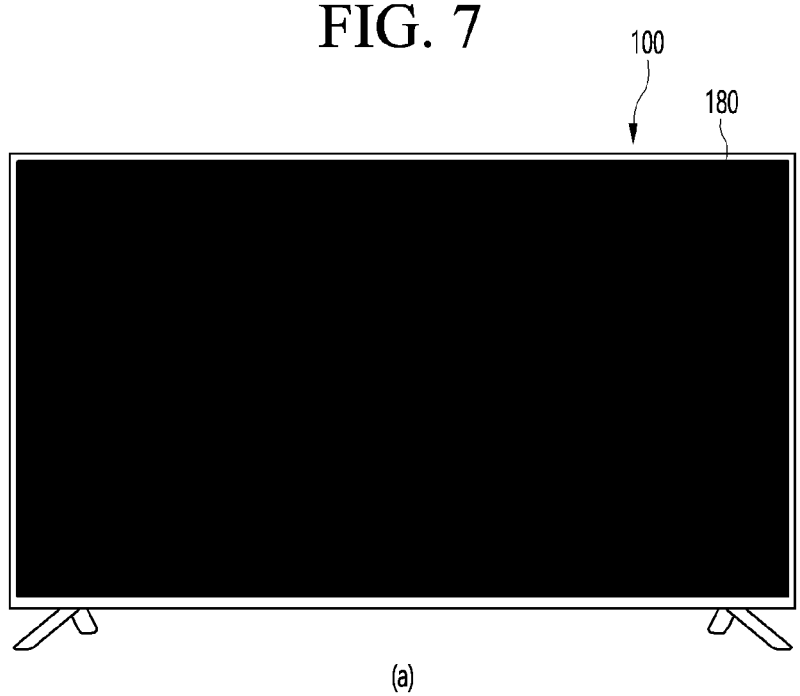
FIG. 7 is a view illustrating a state in which the display device according to the embodiment of the present disclosure outputs the primary command recognition notification.
Figure 7:
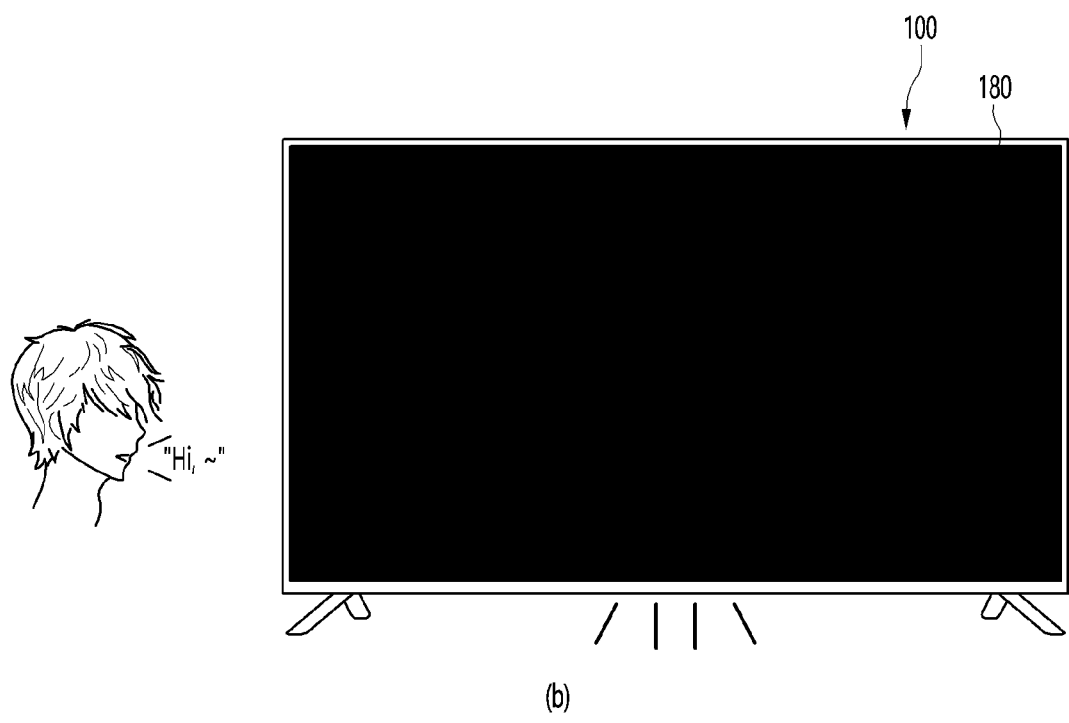

FIG. 7 is a view illustrating a state in which the display device according to the embodiment of the present disclosure outputs the primary command recognition notification.

For example, the display device 100 may further include a light emitter (not shown), and the controller 170 may output the primary command recognition notification by deriving the light emitter (not shown).

Although the light emitter (not shown) may be mounted on the lower portion of the rear surface of the display device 100, the position of the light emitter (not shown) is only an example and is not limited thereto. The light emitter (not shown) may include at least one LED.

Referring to (a) of FIG. 7, since the display device 100 does not recognize any command, the light emitter (not shown) may be off. Meanwhile, as shown in (b) of FIG. 7, the controller 170 may output the primary command recognition notification, by controlling the light emitter (not shown) to be turned on when the primary command is being recognized. For example, the controller 170 may control the light emitter (not shown) to emit light a preset number of times (e.g., 4 times), when the primary command is recognized.

A user who is uttering the primary command may easily determine whether the primary command is recognized through light emitted from the light emitter (not shown).

In this case, the display device 100 may inform the user of the recognition state of the primary command.

FIG. 6 will be described again.

The controller 170 may maintain the suspend mode when the primary command is not recognized.

Meanwhile, when the primary command is recognized in the suspend mode, the controller 170 may switch the power mode from the suspend mode to the active-standby mode (S15).

As the power mode is switched to the active-standby mode, not only the sub controller but also the main controller may operate by receiving power.

The controller 170 may switch the power mode to the active-standby mode and control the voice recognition module (not shown) to be turned on (S17).

That is, when the primary command is recognized, the controller 170 may control the voice recognition module (not shown) to be turned on. Specifically, the main controller may control the voice recognition module (not shown) to be turned on, and the voice recognition module (not shown) may enter a standby state for recognizing and analyzing a voice.

The voice recognition module (not shown) may be a remote voice recognition module.

In addition, as the voice recognition module (not shown) is controlled to be turned on and operated, the embedded NLP module may be driven.

When the embedded NLP module operates to recognize a secondary command, since the secondary command may be received regardless of a network state, operation stability may be improved.

In addition, when the embedded NLP module operates, since a command to be recognized may be set according to the language of the country, the command may be recognized regardless of the language of the country.

In addition, when the embedded NLP module operates, it may be set to differently operate according to the type of the secondary command, thereby improving user convenience. This will be described through step S25 in detail.

The controller 170 may output a secondary command recognition preparation complete notification (S19).

Specifically, the controller 170 may output the secondary command recognition preparation complete notification after recognizing the primary command. The controller 170 may output the secondary command recognition preparation complete notification after controlling the voice recognition module (not shown) to be turned on.

The secondary command recognition preparation complete notification may be a notification for notifying the user that the primary command has been recognized and thus the secondary command may be recognized.

Figure 8:
FIG. 8 is a view illustrating a state in which a display device according to an embodiment of the present disclosure outputs a secondary command recognition preparation complete notification.
Figure 8:
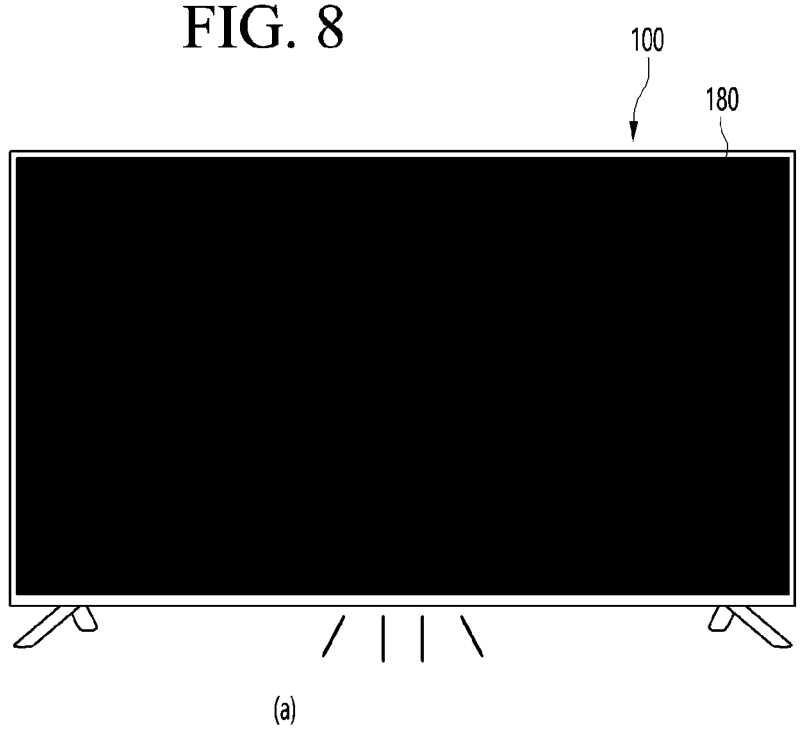
Figure 8:
Figure 8:
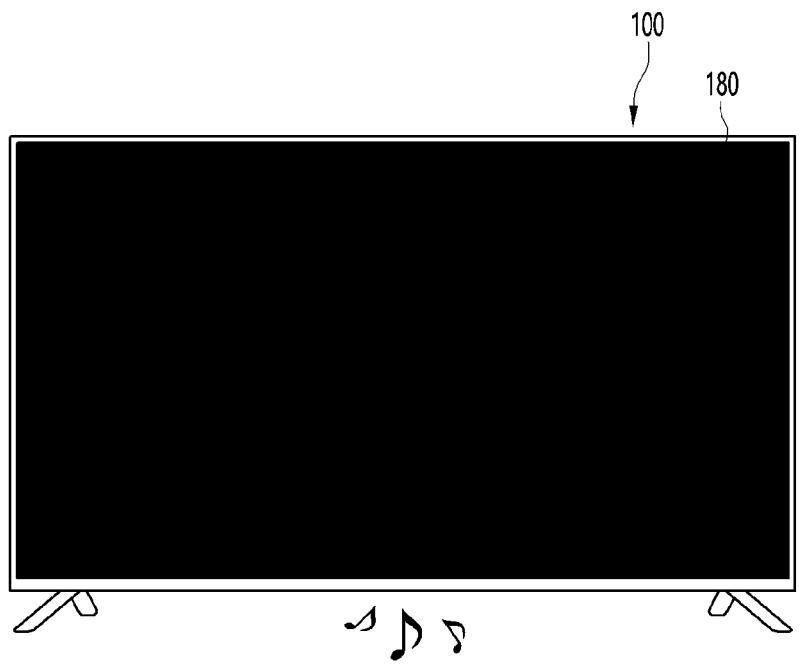

FIG. 8 is a view illustrating a state in which a display device according to an embodiment of the present disclosure outputs a secondary command recognition preparation complete notification.

For example, the controller 170 may output the secondary command recognition preparation complete notification, by driving the audio output interface 185.

The audio output interface 185 may be mounted on the lower portion of the rear surface of the display device 100, but the position of the audio output interface 185 is only an example and is not limited thereto. The audio output interface 185 may include a speaker.

As shown in (a) of FIG. 8, when the primary command is being recognized, the controller 170 may output the primary command recognition notification by driving the light emitter (not shown).

In addition, when the primary command is extracted and recognized, the controller 170 may control the secondary command to be recognizable. For example, the controller 170 may control the voice recognition module (not shown) to be turned on and control the secondary command to be recognizable. When the secondary command is recognizable, the controller 170 may output the secondary command recognition preparation complete notification by controlling the audio output interface 185 as shown in (b) of FIG. 8. For example, when the secondary command has been recognized, the controller 170 may control the audio output interface 185 to output preset sound.

The user who utters the primary command may recognize that the primary command is normally recognized through light output from the display device 100, and the user who has uttered the primary command has recognized the primary command through the sound output from the audio output interface 185 and easily know whether the secondary command is able to be uttered.

That is, the display device 100 may notify the user of the recognition state of the primary command and the recognizable state of the secondary command.

In addition, since the embedded NLP module operates after the display device 100 outputs the secondary command recognition preparation complete notification, it is possible to minimize a deviation between user's utterance timing and command recognition timing of the display device 100.

FIG. 6 will be described again.

The controller 170 may recognize the secondary command (S21).

When the power mode is an active-standby mode, the controller 170 may recognize the secondary command. In particular, when the power mode is an active-standby mode, since the main controller operates, the main controller may recognize the secondary command through the NLP module.

The secondary command may be a command for switching the power mode from the active-standby mode to the active mode. The secondary command may be a command for determining operation content.

The secondary command may be preset. For example, the secondary command may be "TV On", but this is only an example and the second command is not limited thereto.

The secondary command may be changed according to user settings. The number of secondary commands may be one or two or more.

Meanwhile, when the secondary command is received, the controller 170 may set a keyword such that different operations are performed according to the secondary command.

Specifically, since the sub controller has a relatively small capacity, the length of the command may be limited and the number of settable commands may be limited. Meanwhile, since the main controller has a relatively large capacity, various commands may be set. Accordingly, the main controller may variously set a keyword related to the secondary command such that different operations are performed according to the secondary command. A method of performing different operations according to the keyword will be described through step S25 in detail.

When the secondary command is not recognized, the controller 170 may switch the power mode from the active-standby mode to the suspend mode (S27).

When the secondary command is not recognized in the active-standby mode, the controller 170 may switch the power mode from the active-standby mode to the suspend mode.

Since power consumption in the active-standby mode is greater than that in the suspend mode, when the secondary command cannot be recognized, it is possible to minimize unnecessary power consumption by changing the power mode.

According to an embodiment, when the secondary command is not recognized for a predetermined time after the primary command is recognized, the controller 170 may switch the power mode from the active-standby mode to the suspend mode.

The controller 170 may control the voice recognition module (not shown) to be turned off (S29).

When the secondary command is not recognized after the primary command is recognized, the controller 170 may control the voice recognition module (not shown) to be turned off.

The controller 170 may switch the power mode from the active-standby mode to the suspend mode and then control the voice recognition module (not shown) to be turned off or control the voice recognition module (not shown) to be turned off and then switch the power mode from the active-standby mode to the suspend mode. That is, the order of step S27 and step 29 may be changed.

When the secondary command is not recognized, by controlling the voice recognition module (not shown) to be turned off, it is possible to reduce power consumption of the voice recognition module (not shown).

Meanwhile, when the secondary command is recognized, the controller 170 may switch the power mode to the active-standby mode to the active mode (S23).

The controller 170 may recognize the secondary command when the power mode is an active-standby mode, and switch the power mode from the active-standby mode to the active mode when the secondary command is recognized in the active-standby mode.

By controlling the power mode to be the active-standby mode until the secondary command is recognized, the case where the display 180 is unnecessarily turned on/off may be minimized and power consumption of the display 180 may be reduced.

The controller 170 may turn on the display 180, by controlling the power mode to be the active mode when the secondary command is recognized.

In summary, the controller 170 may recognize the primary command when the power mode is a suspend mode, switch the power mode to the suspend mode to the active-standby mode when the primary command is recognized in the suspend mode, recognize the secondary command when the power mode is an active-standby mode, and switch the power mode from the active-standby mode to the active mode when the secondary command is recognized in the active-standby mode.

When the secondary command is recognized, the controller 170 may display an image according to the secondary command (S25).

According to a first embodiment, the controller 170 may display an image on the display 180 by recognizing the secondary command. For example, when the secondary command is recognized, the controller 170 may control the display 180 to display an image of a channel when the power is turned off immediately before, this is only an example and the present disclosure is not limited thereto.

According to a second embodiment, the controller 170 may differently control an image or information displayed through the display 180 according to the secondary command.

For example, the controller 170 may extract a preset keyword from the secondary command and differently control the image or the information to be displayed according to the extracted keyword.

Specifically, when the secondary command includes the preset keyword, the controller 170 may control the display 180 to display at least one of the image or information set in correspondence with the keyword.

Next, various examples of a method of displaying an image according to the secondary command by the display device 100 according to the embodiment of the present disclosure will be described with reference to FIGS. 9 to 13.

Figure 9:
FIG. 9 is a view illustrating an image displayed when a display device according to an embodiment of the present disclosure receives a secondary command including a power-on related keyword.
Figure 9:
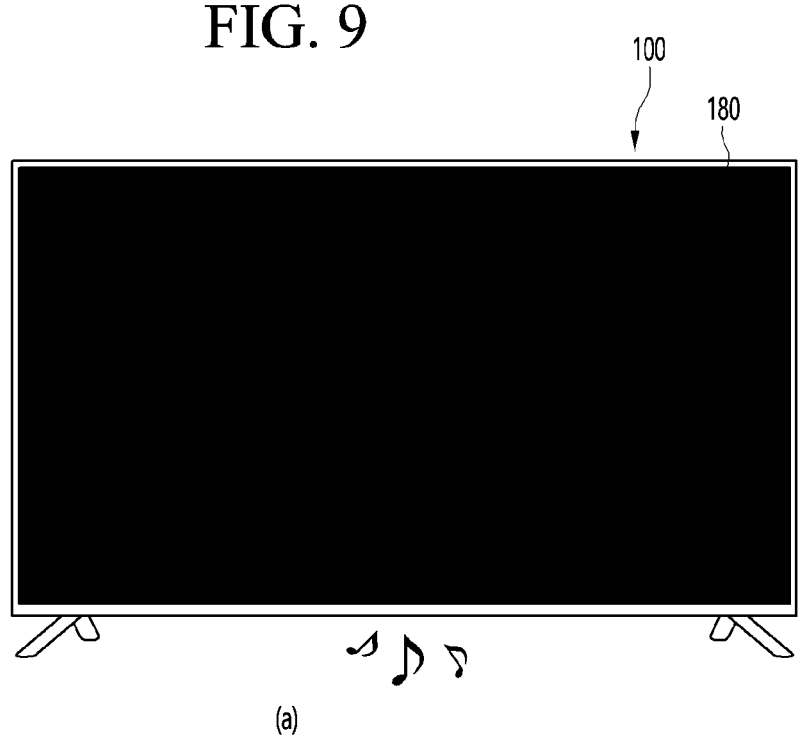
Figure 9:
Figure 9:
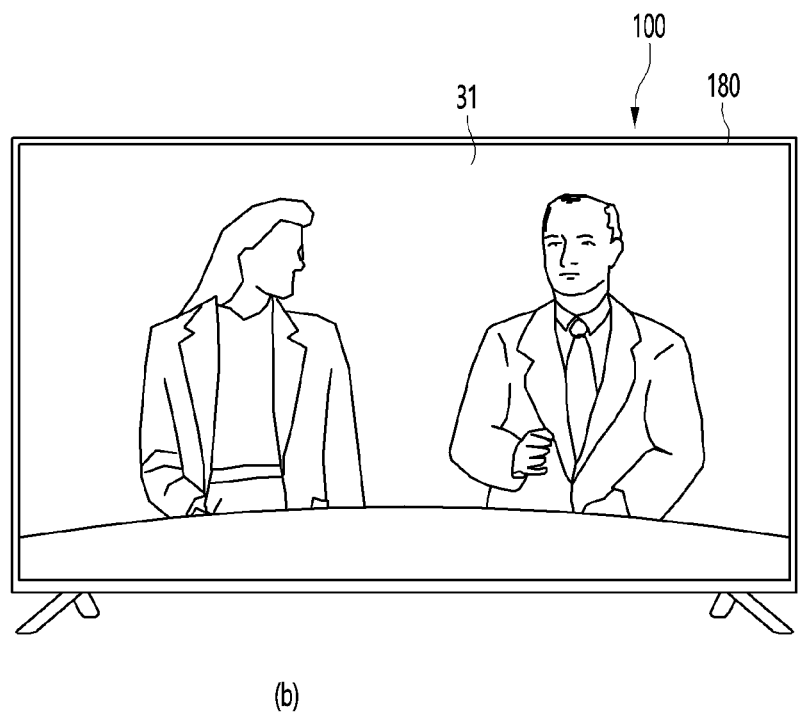

FIG. 9 is a view illustrating an image displayed when a display device according to an embodiment of the present disclosure receives a secondary command including a power-on related keyword.

Referring to (a) of FIG. 9, the controller 170 may output the secondary command recognition preparation complete notification after recognizing the primary command such as "Hi, LG". The controller 170 may receive the secondary command as shown in (b) of FIG. 9 after outputting the secondary command recognition preparation complete notification.

The controller 170 may determine whether the secondary command includes a preset keyword, when the secondary command is received.

The number of preset keywords may be one or more. The preset keyword may include at least some or all of a power-on related keyword, a time related keyword, a user related keyword, a channel related keyword and an application related keyword. However, the above-described keywords are only examples for convenience of description and the number and types of keywords for setting operation according to the secondary command may vary.

As shown in (b) of FIG. 9, when the secondary command such as "TV On" is received, the controller 170 may determine that the secondary command includes the power-on related keyword.

According to the first embodiment, when the keyword included in the secondary command is a power-on related keyword, the controller 170 may control the display 180 to display a channel image 31 when the power is turned off immediately before.

For example, the display device 100 may display an image of channel 1 which is a channel image when the power is turned off immediately before, if the power is turned off while the image of channel 1 is displayed (the power mode is switched from the active mode to the suspend mode) and then the primary command and the secondary command such as "TV On" are received.

According to the second embodiment, the controller 170 may display the display 180 to display a default image, when the keyword included in the secondary command is a power-on related keyword.

A default image may mean an image set to be displayed first when the power is turned on. For example, the default image may be an image of channel 1 or an initial screen image of an external device such as a set-top box.

Figure 10:
FIG. 10 is a view illustrating an image when a display apparatus according to an embodiment of the present disclosure receives a secondary command including a time related keyword.
Figure 10:
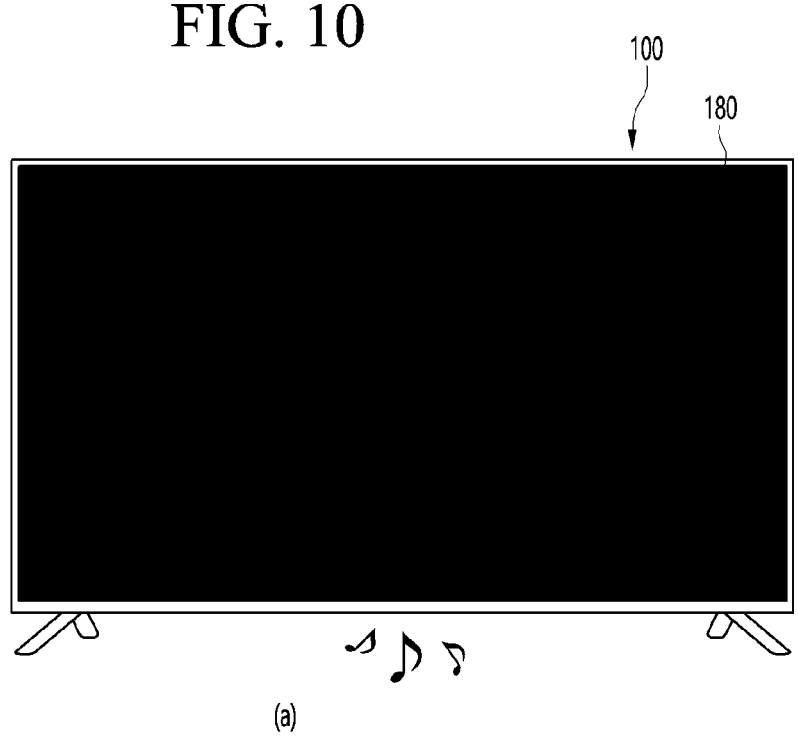
Figure 10:
Figure 10:
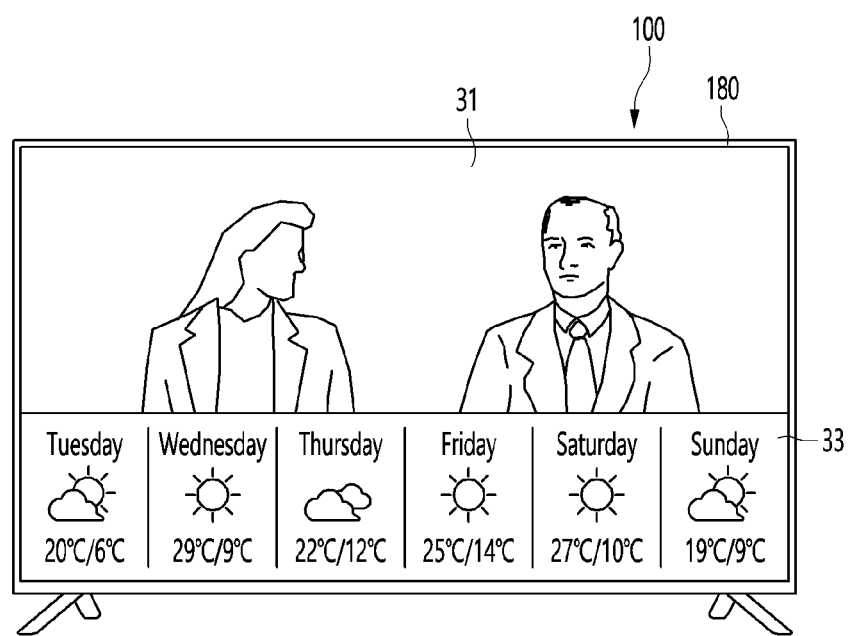

Next, FIG. 10 is a view illustrating an image when a display apparatus according to an embodiment of the present disclosure receives a secondary command including a time related keyword.

Referring to (a) of FIG. 10, the controller 170 may output the secondary command recognition preparation complete notification after recognizing the primary command such as "Hi, LG". The controller 170 may receive the secondary command as shown in (b) of FIG. 10 after outputting the secondary command recognition preparation complete notification.

When the secondary command is received, the controller 170 may determine whether the secondary command includes a preset keyword. The preset keyword is equal to that described in FIG. 9 and thus a repeated description will be omitted.

As shown in (b) of FIG. 10, when the secondary command such as "Good morning" is received, the controller 170 may determine that the secondary command includes a time related keyword.

When the keyword included in the secondary command is a time related keyword, the controller 170 may control the display 180 to display a broadcast image 31 and information 33 corresponding to a time. In some embodiments, the broadcast image 31 may be omitted.

For example, the broadcast image 31 may be a channel image when the power is turned off immediately before, but it is only an example and the present disclosure is not limited thereto.

The information 33 corresponding to the time may be differently set according to the time. For example, when the keyword included in the secondary command is a morning related keyword, weather information including today's weather may be displayed as the information 33 corresponding to the time, and, when the keyword included in the secondary command is an evening related keyword, today's news information may be displayed as the information 33 corresponding to the time.

In this case, by displaying information required by the user together with the broadcast image as soon as the power is turned on, it is possible to provide the display device 100 with increased user convenience.

Figure 11:
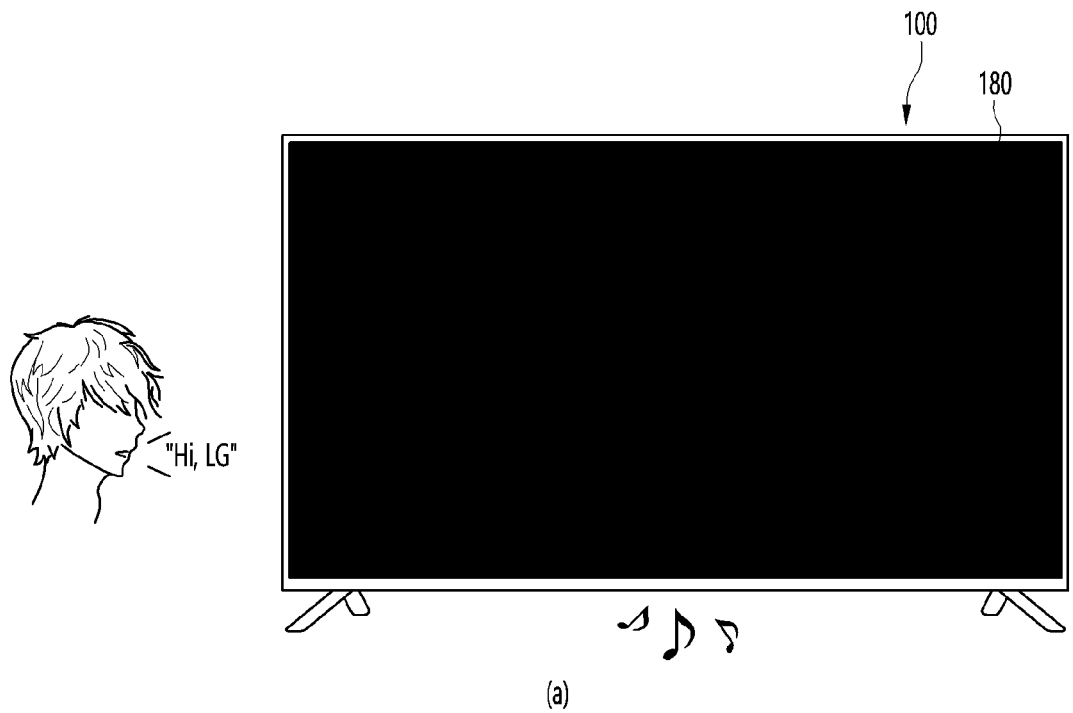
FIG. 11 is a view illustrating an image displayed when a display device according to an embodiment of the present disclosure receives a secondary command including a user related keyword.
Figure 11:
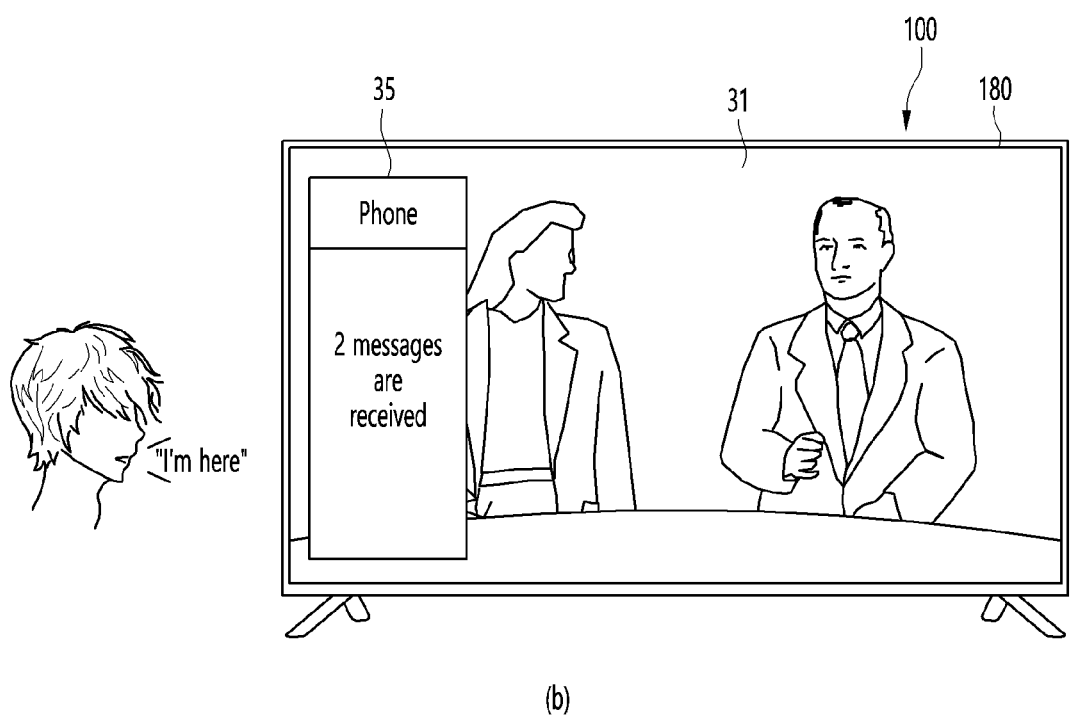

Next, FIG. 11 is a view illustrating an image displayed when a display device according to an embodiment of the present disclosure receives a secondary command including a user related keyword.

Referring to (a) of FIG. 11, the controller 170 may output the secondary command recognition preparation complete notification after recognizing a primary command such as "Hi, LG". The controller 170 may receive a secondary command as shown in (b) of FIG. 11 after outputting the secondary command recognition preparation complete notification.

When the secondary command is received, the controller 170 may determine whether the secondary command includes a preset keyword. The preset keyword is equal to that described in FIG. 9 and thus a repeated description will be omitted.

As shown in (b) of FIG. 11, when the secondary command such as "I'm here" is received, the controller 170 may determine that the secondary command includes the user related keyword.

When the keyword included in the secondary command is a user related keyword, the controller 170 may control the display 180 to display a broadcast image 31 and user device information 35.

For example, the broadcast image 31 may be a channel image when the power is turned off immediately before, but it is only an example and the present disclosure is not limited thereto. In some embodiments, the broadcast image 31 may be omitted.

The user device information 35 may be information on a device connected to the display device 100. For example, the display 180 may display state information of an external device connected to the display device 100 as the user device information 35.

For example, the user device information 35 may be mobile phone information connected to the display device 100. In addition, the user device information 35 may include not only information on a mobile phone connected to the display device 100 but also information on another device (e.g., home appliance such as a refrigerator, a washing machine or an air conditioner) connected to the mobile phone connected to the display device 100.

In this case, by displaying information related to the user together with the broadcast image as soon as the power is turned on, it is possible to provide the display device 100 with increased user convenience.

Figure 12:
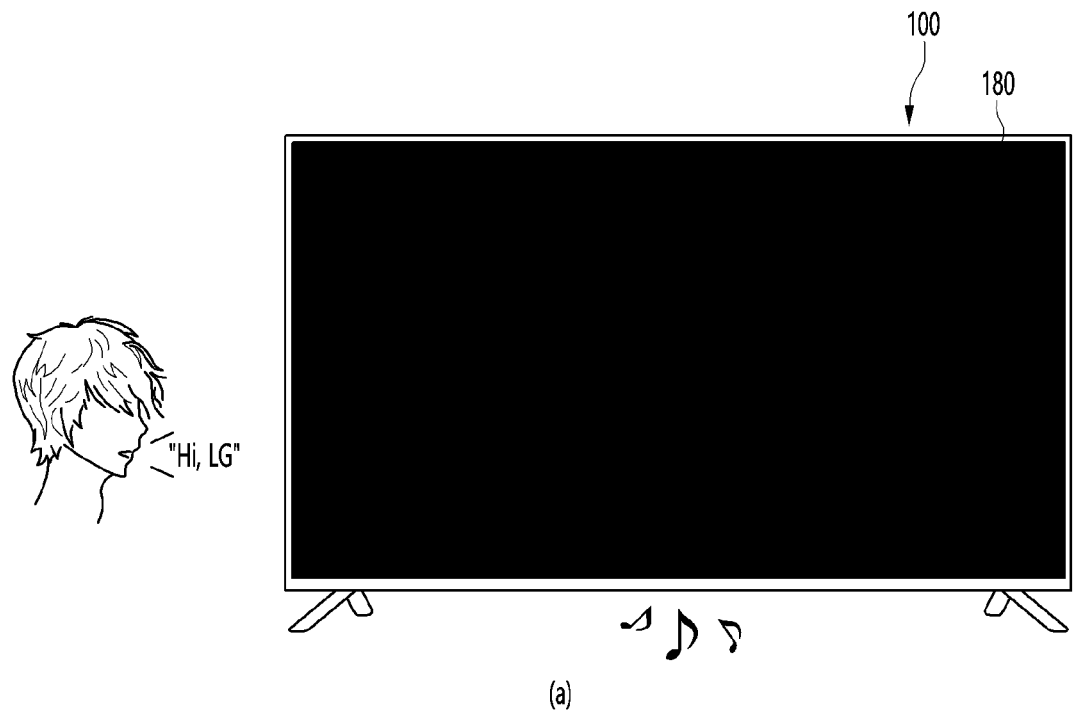
FIG. 12 is a view illustrating an image displayed when a display device according to an embodiment of the present disclosure receives a secondary command including a channel related keyword.
Figure 12:
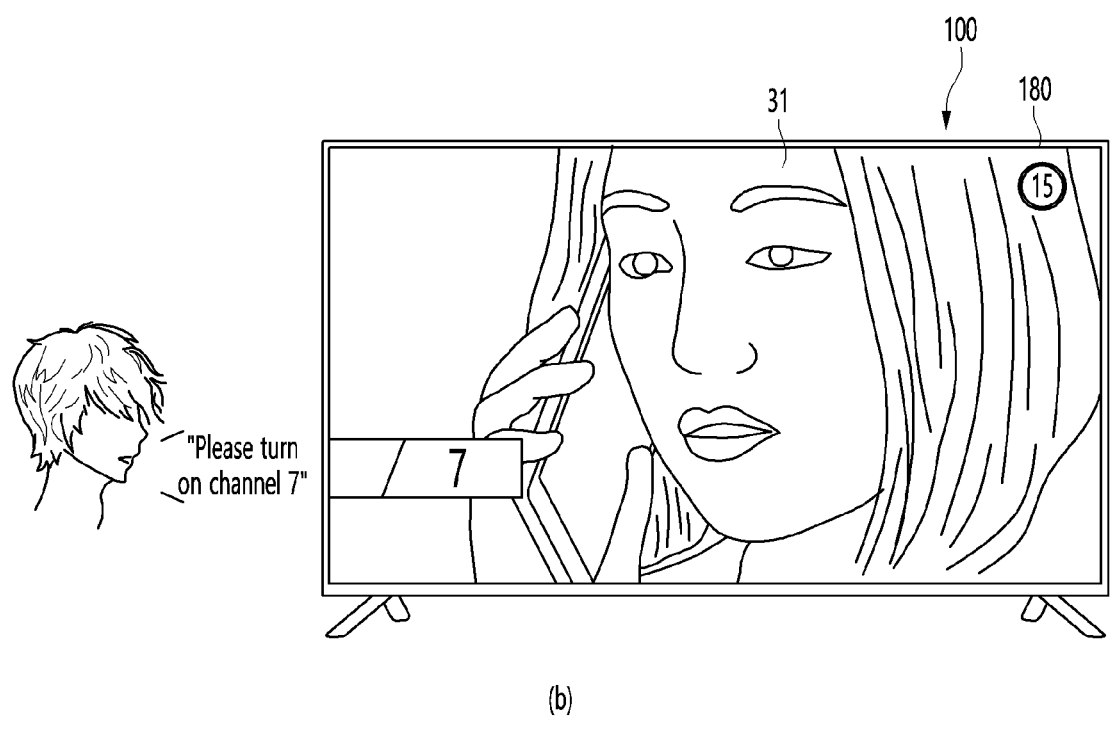

FIG. 12 is a view illustrating an image displayed when a display device according to an embodiment of the present disclosure receives a secondary command including a channel related keyword.

Referring to (a) of FIG. 12, the controller 170 may output the secondary command recognition preparation complete notification after recognizing a primary command such as "Hi, LG". The controller 170 may receive a secondary command as shown in (b) of FIG. 12 after outputting the secondary command recognition preparation complete notification.

When the secondary command is received, the controller 170 may determine whether the secondary command includes a preset keyword. The preset keyword is equal to that described in FIG. 9 and thus a repeated description will be omitted.

As shown in (b) of FIG. 12, when the secondary command such as "Please turn on channel 7" is received, the controller 170 may determine that the secondary command includes the channel related keyword.

When the keyword included in the secondary command is a channel related keyword, the controller 170 may control the display 180 to display an image of the channel included in the secondary command.

According to an example shown in (b) of FIG. 12, the controller 170 may control the display 180 to display the image of channel 7 included in the secondary command.

In this case, by immediately switching to a user's favorite channel as soon as the power is turned on, it is possible to provide the display device 100 with increased user convenience.

Figure 13:
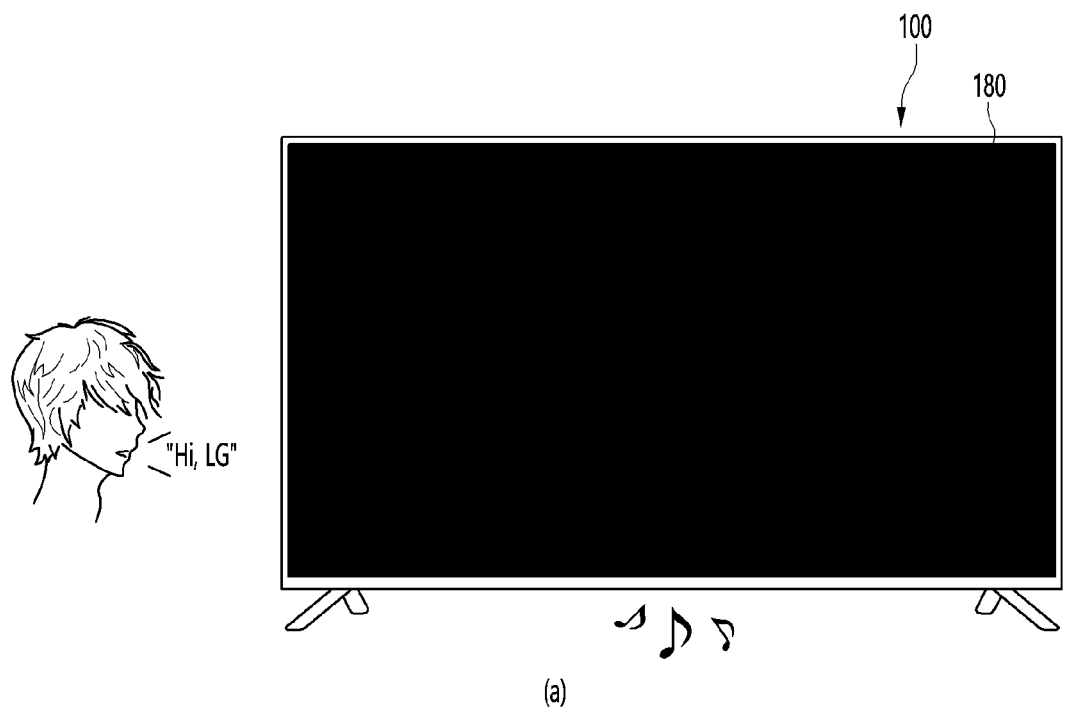
FIG. 13 is a view illustrating an image displayed when a display device according to an embodiment of the present disclosure receives a secondary command including an application related keyword.
Figure 13:
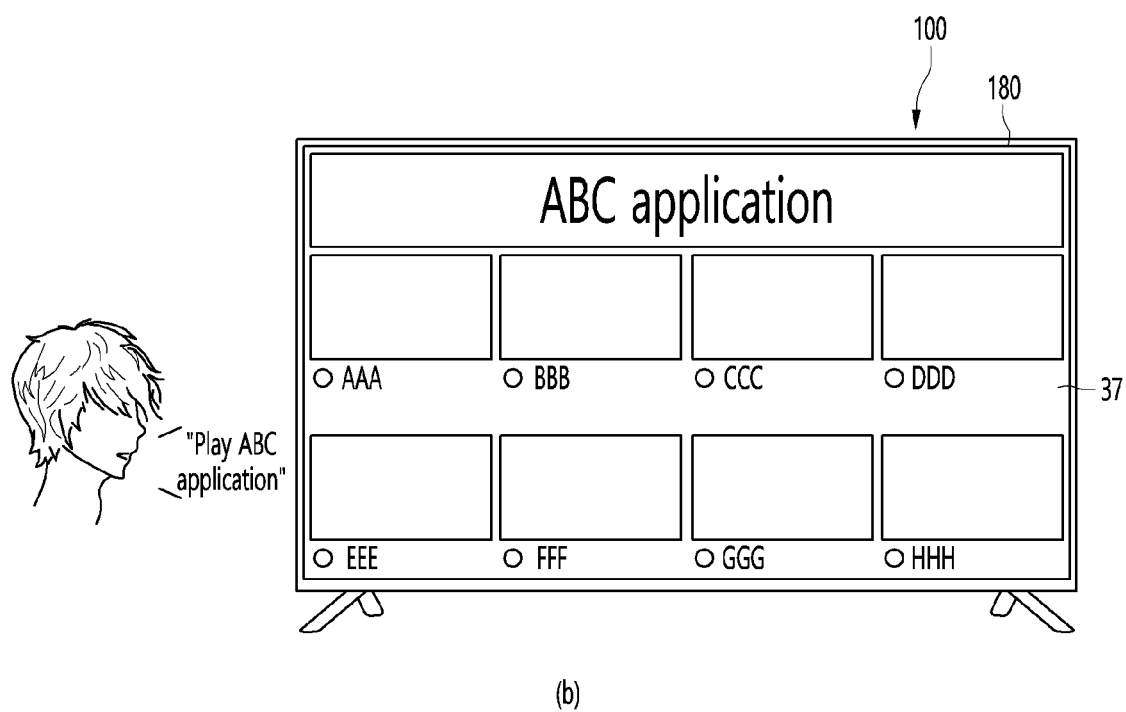

FIG. 13 is a view illustrating an image displayed when a display device according to an embodiment of the present disclosure receives a secondary command including an application related keyword.

Referring to (a) of FIG. 13, the controller 170 may output the secondary command recognition preparation complete notification after recognizing a primary command such as "Hi, LG". The controller 170 may receive a secondary command as shown in (b) of FIG. 13 after outputting the secondary command recognition preparation complete notification.

When the secondary command is received, the controller 170 may determine whether the secondary command includes a preset keyword. The preset keyword is equal to that described in FIG. 9 and thus a repeated description will be omitted.

As shown in (b) of FIG. 13, when the secondary command such as "Play ABC application" is received, the controller 170 may determine that the secondary command includes the application related keyword.

When the keyword included in the secondary command is an application related keyword, the controller 170 may control the display 180 to display an execution image of the application included in the secondary command.

According to an example shown in (b) of FIG. 13, the controller 170 may control the display 180 to display the execution image of an ABC application included in the secondary command.

In this case, since the application is executed as soon as the power is turned on, it is possible to provide the display device 100 capable of reducing a time required to execute the application.

As described above, the display device 100 according to the present disclosure may control the power mode to be the active mode when both the primary command and the secondary command are sequentially recognized through the voice acquisition module 175.

That is, the display device 100 according to the present disclosure may perform operation according to a command only when the command is secondarily verified. In addition, compared to the case where the display device 100 primarily verifies the command, command recognition accuracy may increase. That is, when the display device 100 secondarily verifies the command, it is possible to minimize misrecognition and to reduce the number of times of malfunction, compared to the case of primarily verifying the command. In particular, it is possible to reduce power consumption occurring when the display 180 is turned on due to malfunction.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
a display;
a light emitter;
an audio output interface;
at least one microphone configured to acquire audio; and
a controller configured to control a power mode of the display device based on a sequential receipt of a primary command in a predetermined list of primary command keywords and a secondary command in a predetermined list of secondary command keywords through the at least one microphone,
wherein the controller is divided into a main controller and a sub controller, the main controller comprising a voice recognition device,
wherein the controller is configured to:
maintain the display device in a suspend mode, the suspend mode being a mode in which power is supplied to the sub controller and power is not supplied to the main controller or to the display,
while in the suspend mode:
receive first audio information through the at least one microphone, and
determine whether the first audio information corresponds to the primary command in the predetermined list of primary command keywords,
upon determining that the first audio information corresponds to the primary command in the predetermined list of primary command keywords:
output a first command recognition notification by driving the light emitter in a predetermined manner, shift the display device from the suspend mode to an active-standby mode, the active-standby mode being a mode in which power is supplied to the sub controller and the main controller and power is not supplied to the display, control the voice recognition device to be turned on, and output a second command recognition preparation complete notice, after outputting the second command recognition preparation complete notice and while in the active-standby mode:

receive secondary audio information through the at least one microphone, and determine whether the secondary audio information corresponds to the secondary command in the predetermined list of secondary command keywords, upon determining that the secondary audio information corresponds to the secondary command contained in the predetermined list of secondary command keywords:

shift the display device from the active-standby mode to the active mode, the active mode being a mode in which power is supplied to the sub controller, the main controller and the display, and after turning on the display via the active mode, control the display device to display an image according to the secondary command.

2. The display device of claim 1, wherein, upon determining that the first audio information does not correspond to any primary command in the predetermined list of primary command keywords, the controller is configured to maintain the display device in the suspend mode.

3. The display device of claim 1, wherein, upon determining that the secondary audio information does not correspond to any secondary command contained in the predetermined list of secondary command keywords, the controller is configured to:

shift the display device from the active-standby mode to the suspend mode, and control the voice recognition device to be turned off.

4. The display device of claim 1, wherein, upon determining that the secondary audio information includes a power-on related keyword contained in the predetermined list of secondary command keywords, the controller is configured to control the display to display a channel image that was displayed immediately prior to when power to the display was previously turned off.

5. The display device of claim 1, wherein, upon determining that the secondary audio information includes a time related keyword contained in the predetermined list of secondary command keywords, the controller is configured to control the display to display a broadcast image and information corresponding to a time.

6. The display device of claim 1, wherein, upon determining that the secondary audio information includes a user related keyword contained in the predetermined list of secondary command keywords, the controller is configured to control the display to display a broadcast image and user device information.

7. The display device of claim 6, wherein the display displays state information of an external device connected to the display device as the user device information.

8. The display device of claim 1, wherein, upon determining that the secondary audio information includes a channel related keyword contained in the predetermined list of secondary command keywords, the controller is configured to control the display to display an image of a channel included in the secondary command.

9. The display device of claim 1, wherein, upon determining that the secondary audio information includes an application related keyword contained in the predetermined list of secondary command keywords, the controller is configured to control the display to display an execution image of an application included in the secondary command.

10. A method of operating display device that includes a display, a light emitter, an audio output interface, at least one microphone configured to acquire audio, a controller configured to control a power mode of the display device based on a sequential receipt of a primary command in a predetermined list of primary command keywords and a secondary command in a predetermined list of secondary command keywords through the at least one microphone, wherein the controller is divided into a main controller and a sub controller, the main controller comprising a voice recognition device, the method performed by the controller and comprising:

maintaining the display device in a suspend mode, the suspend mode being a mode in which power is supplied to the sub controller and power is not supplied to the main controller or to the display;

while in the suspend mode:

receiving first audio information through the at least one microphone; and determining whether the first audio information corresponds to the primary command in the predetermined list of primary command keywords;

upon determining that the first audio information corresponds to the primary command in the predetermined list of primary command keywords:

outputting a first command recognition notification by driving the light emitter in a predetermined manner;

shifting the display device from the suspend mode to an active-standby mode, the active-standby mode being a mode in which power is supplied to the sub controller and the main controller and power is not supplied to the display;

controlling the voice recognition device to be turned on; and outputting a second command recognition preparation complete notice;

after outputting the second command recognition preparation complete notice and while in the active-standby mode:

receiving secondary audio information through the at least one microphone; and determining whether the secondary audio information corresponds to the secondary command in the predetermined list of secondary command keywords; and upon determining that the secondary audio information corresponds to the secondary command contained in the predetermined list of secondary command keywords:

shifting the display device from the active-standby mode to the active mode, the active mode being a mode in which power is supplied to the sub controller, the main controller and the display; and after turning on the display via the active mode, controlling the display device to display an image according to the secondary command.

11. A non-transitory computer product containing instructions for a method of operating device that includes a display, a light emitter, an audio output interface, at least one microphone configured to acquire audio, a controller configured to control a power mode of the display device based on a sequential receipt of a primary command in a predetermined list of primary command keywords and a secondary command in a predetermined list of secondary command keywords through the at least one microphone, wherein the controller is divided into a main controller and a sub controller, the main controller comprising a voice recognition device, the method performed by the controller and comprising:

maintaining the display device in a suspend mode, the suspend mode being a mode in which power is supplied to the sub controller and power is not supplied to the main controller or the display;

while in the suspend mode:
receiving first audio information through the at least one microphone; and
determining whether the first audio information corresponds to the primary command in the predetermined list of primary command keywords;

upon determining that the first audio information corresponds to the primary command in the predetermined list of primary command keywords:
outputting a first command recognition notification by driving the light emitter in a predetermined manner;
shifting the display device from the suspend mode to an active-standby mode, the active-standby mode being a mode in which power is supplied to the sub controller and the main controller and power is not supplied to the display;
controlling the voice recognition device to be turned on; and
outputting a second command recognition preparation complete notice;

after outputting the second command recognition preparation complete notice and while in the active-standby mode:
receiving secondary audio information through the at least one microphone; and
determining whether the secondary audio information corresponds to the secondary command in the predetermined list of secondary command keywords; and upon determining that the secondary audio information corresponds to the secondary command contained in the predetermined list of secondary command keywords:
shifting the display device from the active-standby mode to the active mode, the active mode being a mode in which power is supplied to the sub controller, the main controller and the display; and
after turning on the display via the active mode, controlling the display device to display an image according to the secondary command.

* * * * *